United States Patent
Mutnuru et al.

(10) Patent No.: US 10,237,176 B2
(45) Date of Patent: Mar. 19, 2019

(54) AUTO DISCOVERY AND AUTO SCALING OF SERVICES IN SOFTWARE-DEFINED NETWORK ENVIRONMENT

(71) Applicant: Juniper Networks, Inc., Sunnyvale, CA (US)

(72) Inventors: Rishi K. Mutnuru, Santa Clara, CA (US); Padmanabha Nallur, Fremont, CA (US); Dilip H. Sanghavi, Cupertino, CA (US); Huei-ping Chen, San Jose, CA (US); Narasimha Talapady Nayak, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 45 days.

(21) Appl. No.: 15/199,069

(22) Filed: Jun. 30, 2016

(65) Prior Publication Data
US 2018/0006935 A1   Jan. 4, 2018

(51) Int. Cl.
*H04L 12/715* (2013.01)
*H04L 12/46* (2006.01)
(Continued)

(52) U.S. Cl.
CPC .......... *H04L 45/64* (2013.01); *H04L 12/4633* (2013.01); *H04L 12/66* (2013.01);
(Continued)

(58) Field of Classification Search
None
See application file for complete search history.

(56) References Cited

U.S. PATENT DOCUMENTS 8,693,374 B1   4/2014 Murphy et al.
2013/0329548 A1*  12/2013 Nakil .................. H04L 41/0668
370/228

(Continued)

FOREIGN PATENT DOCUMENTS

EP         2854347 A2    4/2015
WO      2013184846 A1    6/2013

OTHER PUBLICATIONS

"Network Functions Virtualisation (NFV); Management and Orchestration," European Telecommunications Standards Institute, ETSI GS NFV-MAN 001 v1.1.1, Dec. 2014, 184 pp.

(Continued)

*Primary Examiner* — Donald L Mills
(74) *Attorney, Agent, or Firm* — Shumaker & Sieffert, P.A.

(57) ABSTRACT

Techniques are described for automatic discovery of two or more virtual service instances configured to apply a given service to a packet in a software-defined networking (SDN)/network functions virtualization (NFV) environment. Virtual service instances may be deployed as virtual entities hosted on one or more physical devices to offer individual services or chains of services from a service provider. The use of virtual service instances enables automatic scaling of the services on-demand. The techniques of this disclosure enable automatic discovery by a gateway network device of virtual service instances for a given service as load balancing entities. According to the techniques, the gateway network device automatically updates a load balancing group for the given service to include the discovered virtual service instances on which to load balance traffic for the service. In this way, the disclosed techniques provide auto-scaling and auto-discovery of services in an SDN/NFV environment.

26 Claims, 6 Drawing Sheets

(51) Int. Cl.

| | | |
|---|---|---|
| *H04L 12/66* | (2006.01) | |
| *H04L 12/751* | (2013.01) | |
| *H04L 12/707* | (2013.01) | |
| *H04L 12/723* | (2013.01) | |
| *H04L 12/803* | (2013.01) | |
| *H04L 29/08* | (2006.01) | |
| *H04L 12/717* | (2013.01) | |

(52) U.S. Cl.
CPC .............. *H04L 45/02* (2013.01); *H04L 45/22* (2013.01); *H04L 45/24* (2013.01); *H04L 45/42* (2013.01); *H04L 45/507* (2013.01); *H04L 47/125* (2013.01); *H04L 67/1002* (2013.01)

(56) References Cited

U.S. PATENT DOCUMENTS

| | | | |
|---|---|---|---|
| 2014/0241247 A1* | 8/2014 | Kempf | H04L 12/4633 370/328 |
| 2014/0304414 A1 | 10/2014 | Yengalasetti et al. | |
| 2015/0029849 A1* | 1/2015 | Frost | H04L 47/125 370/235 |
| 2015/0092551 A1 | 4/2015 | Moisand et al. | |
| 2015/0146536 A1* | 5/2015 | Minei | H04L 45/507 370/236 |
| 2015/0149812 A1* | 5/2015 | Arisoylu | G06F 11/0793 714/4.1 |
| 2016/0139939 A1* | 5/2016 | Bosch | H04L 67/10 718/1 |
| 2017/0366452 A1 | 12/2017 | Moisand et al. | |

OTHER PUBLICATIONS

"Contrail Architecture," White Paper, Juniper Networks, Inc., Sep. 2015, 44 pp.
"Enabling Solutions in Cloud Infrastructure and for Network Functions Virtualization," White Paper, Juniper Networks, Inc., Feb. 2015, 16 pp.
U.S. Appl. No. 14/228,706, by Jerome P. Moisand, filed Mar. 28, 2014.
Rekhter, "IPv6 Address Specific BGP Extended Community Attribute," RFC 5701, Network Working Group, Nov. 2009, 5 pp.
Rosen et al., "IANA Registries for BGP Extended Communities," RFC 7153, Internet Engineering Task Force (IETF), Mar. 2014, 16 pp.
Sangli, "BGP Extended Communities Attribute," RFC 4360, Network Working Group, Feb. 2006, 12 pp.
Scudder et al., "Capabilities Advertisement with BGP-4," RFC 5492, Network Working Group, Feb. 2009, 7 pp.
U.S. Appl. No. 15/823,906, by Juniper Networks Inc., (Inventors: Mutnuru et al.), filed Nov. 28, 2017.
Response to the Extended Search Report from counterpart European Application No. 17178809.4, dated Oct. 16, 2017, filed Jul. 2, 2018, 14 pp.
Fernando et al., "Service Chaining using Virtual Networks with BGP VPNs, draft-ietf-bess-service-chaining-00," Internet-Draft, BGP Enabled Services (bess) Apr. 13, 2015, 41 pp.
Extended Search Report from counterpart European Application No. 17178809.4, dated Oct. 16, 2017, 9 pp.
Examination Report from counterpart European Application No. 17178809.4, dated Sep. 3, 2018, 9 pp.
Response to Examination Report dated Sep. 1, 2018, from counterpart European Application No. 17178809.4, filed Jan. 9, 2019, 10 pp.

* cited by examiner

AUTO DISCOVERY AND AUTO SCALING OF SERVICES IN SOFTWARE-DEFINED NETWORK ENVIRONMENT

TECHNICAL FIELD

The disclosure relates to computer networks and, more specifically, to network services in computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. Certain devices, referred to as routers, within a computer network maintain routing information that describes routes through the network. A "route" can generally be defined as a path between two locations on the network. Routers include a control plane that maintains the routing information, and a data plane that forwards received packets according to the routing information.

Network service providers provide services such as security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. The network infrastructure of a service provider network typically includes a vast collection of access nodes, aggregation nodes and high-speed edge routers interconnected by communication links. These network devices typically execute various protocols and exchange signaling messages to anchor and manage subscriber sessions and communication flows associated with subscriber devices.

A software defined networking (SDN) controller and/or a network functions virtualization (NFV) orchestrator may be included in the network architecture to provide centralized control of the subscriber sessions and communication flows within the service provider network. An SDN architecture is often used to provide at least a degree of separation of the control plane and the data plane in network devices, and the abstraction of the control plane into a more modular and layered architecture. An NFV architecture provides virtualization to remove dependency on specialized hardware and to consolidate many different network equipment types onto industry standard high volume servers, switches and storage, which may be located in data centers, network nodes and in end user premises.

SUMMARY

In general, techniques are described for automatic discovery of two or more virtual service instances configured to apply a given service to a packet in a software-defined networking (SDN)/network functions virtualization (NFV) environment. Virtual service instances may be deployed as virtual machines (VMs) or other virtual entities hosted on one or more physical devices, e.g., servers, to offer individual services or chains of services from a service provider. The use of virtual service instances enables automatic scaling (i.e., instantiating or tearing down) of the services on-demand. The techniques of this disclosure enable automatic discovery by a gateway network device, e.g., a router, of virtual service instances for a given service as load balancing entities. According to the techniques, the gateway network device automatically updates a load balancing group for the given service to include the discovered virtual service instances on which to load balance traffic for the service. In this way, the disclosed techniques provide auto-scaling and auto-discovery of services in an SDN/NFV environment.

In one example, this disclosure is directed to a method comprising establishing, by a SDN controller, a border gateway protocol (BGP) peer session with a gateway network device; establishing, by the SDN controller, two or more unique tunnels that each extends from the gateway network device to a respective one of a set of two or more virtual service instances configured to apply a given service to a packet; calculating, by the SDN controller, BGP routes for the given service, wherein each of the BGP routes represents one of the unique tunnels that extends from the gateway network device to the respective one of the virtual service instances; and advertising, by the SDN controller and to the gateway network device via the BGP peer session, the BGP routes for the given service as load balancing entities.

In another example, this disclosure is directed to a method comprising establishing, by a gateway network device, a BGP peer session with a SDN controller; receiving, by the gateway network device and from the SDN controller via the BGP peer session, advertisements of BGP routes for a given service as load balancing entities, wherein each of the BGP routes represents one of a set of two or more unique tunnels that each extends from the gateway network device to a respective one of a set of two or more virtual service instances configured to apply the given service to a packet; maintaining, by the gateway network device, a load balancing group for the given service that includes each of the BGP routes for the given service; and selecting, by the gateway network device and according to a load balancing algorithm, one of the BGP routes from the load balancing group on which to forward the packet to the respective one of the virtual service instances for application of the given service.

In a further example, this disclosure is directed to a SDN controller comprising a plurality of network interfaces; and a control unit comprising a processor executing BGP to establish a BGP peer session on one of the network interfaces with a gateway network device, and establish two or more unique tunnels that each extends from the gateway network device to a respective one of a set of two or more virtual service instances configured to apply a given service to a packet, the processor configured to calculate BGP routes for the given service, wherein each of the BGP routes represents one of the unique tunnels that extends from the gateway network device to the respective one of the virtual service instances, and output the BGP routes for the given service to the one of the network interfaces for advertising as load balancing entities to the gateway network device via the BGP peer session.

In an additional example, this disclosure is directed to a gateway network device comprising a plurality of network interfaces; a control unit comprising a processor executing BGP to establish a BGP peer session on one of the network interfaces with a SDN controller, the processor configured to receive advertisements of BGP routes for a given service as load balancing entities on the one of the network interfaces via the BGP peer session with the SDN controller, wherein each of the BGP routes represents one of a set of two or more unique tunnels that each extends from the gateway network device to a respective one of a set of two or more virtual service instances configured to apply the given service to a packet, and maintain a load balancing group for the given service that includes each of the BGP routes for the given service; and a forwarding circuit programmed with forwarding information associated with the BGP routes, the forwarding circuit configured to select one of the BGP routes for the packet from the load balancing group according to a load balancing algorithm, wherein the forwarding circuit outputs the packet to one of the network interfaces for forwarding to the respective one of the virtual service instances for application of the given service.

The details of one or more embodiments of this disclosure are set forth in the accompanying drawings and the description below. Other features, objects, and advantages will be apparent from the description and drawings, and from the claims.

DETAILED DESCRIPTION

Figure 1:
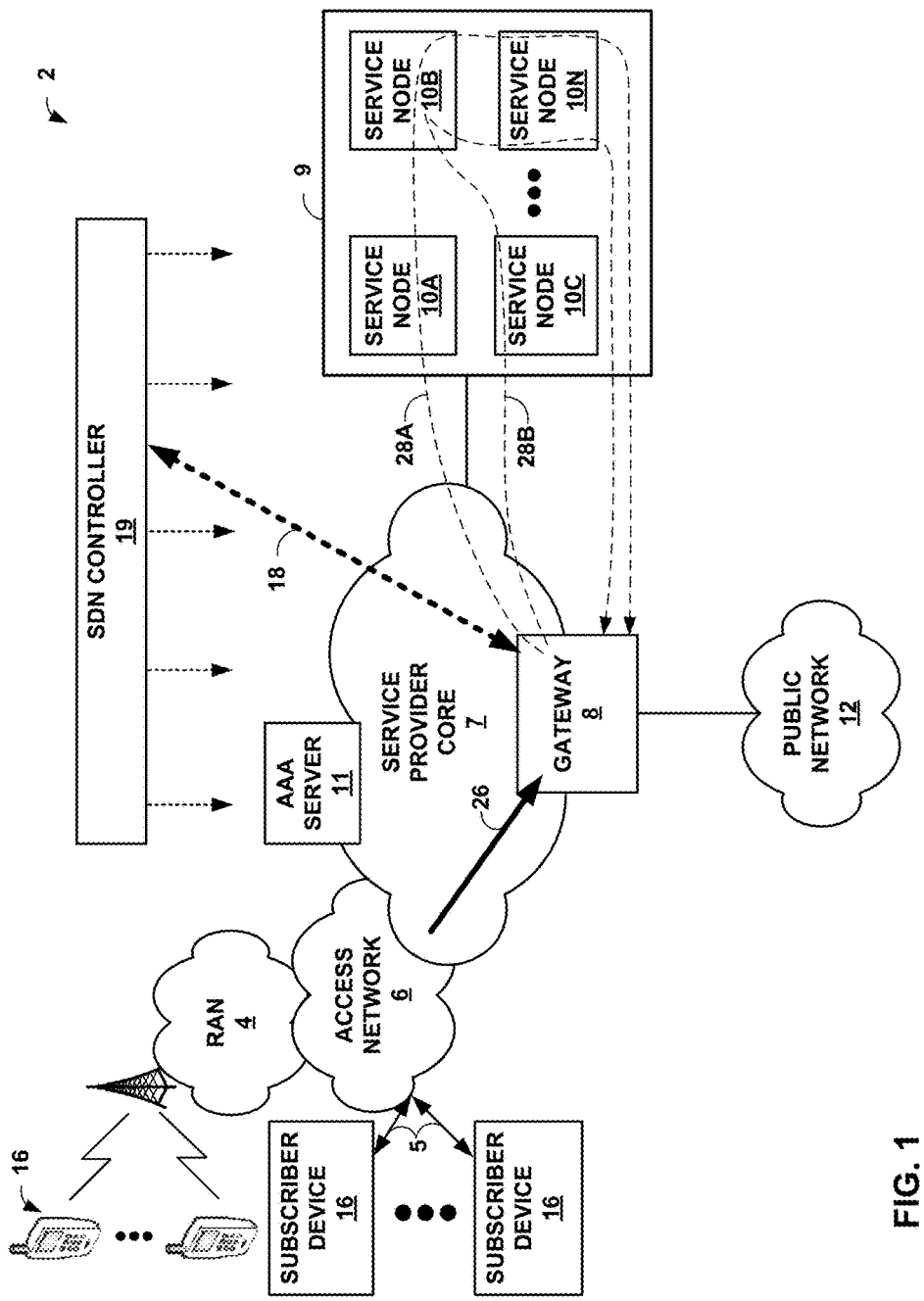
FIG. 1 is a block diagram illustrating an example network system operating in accordance with techniques described herein.

FIG. 1 is a block diagram illustrating an example network system operating in accordance with techniques described herein. The example network system of FIG. 1 includes a service provider network 2 that operates as a private network to provide packet-based network services to subscriber devices 16. That is, service provider network 2 provides authentication and establishment of network access for subscriber devices 16 such that subscriber devices 16 may begin exchanging data packets with public network 12, which may be an internal or external packet-based network such as the Internet.

In the example of FIG. 1, service provider network 2 comprises an access network 6 that provides connectivity to public network 12 via service provider core network 7 and gateway network device 8. Service provider core network 7 and public network 12 provide packet-based services that are available for request and use by subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6) or Point-to-Point Protocol (PPP), to enable packet-based transport of public network 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices 16 include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscriber devices 16 for transport to/from service provider core network 7 of the service provider. Access network 6 includes network nodes that execute communication protocols to transport control and user data to facilitate communication between subscriber devices 16 and gateway 8. Access network 6 may include a broadband access network, a wireless LAN, a public switched telephone network (PSTN), or other type of access network, and may include or otherwise provide connectivity for cellular access networks, such as RAN 4. Examples of RAN 4 include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 offers packet-based connectivity to subscriber devices 16 attached to access network 6 for accessing public network 12. Core network 7 may represent a public network that is owned and operated by a service provider to interconnect a plurality of networks, which may include access network 6. Core network 7 may implement Multi-Protocol Label Switching (MPLS) forwarding and, in such instances, may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of service provider network 2 that include a wireline/broadband access network as access network 6, gateway 8 may represent a Broadband Network Gateway (BNG), Broadband Remote Access Server (BRAS), MPLS Provider Edge (PE) router, core router or gateway, or a Cable Modem Termination System (CMTS), for instance. In examples of service provider network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of service provider network 2 typically offers services to subscribers associated with devices, e.g., subscriber devices 16, that access service provider network 2. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, the network system illustrated in FIG. 1 may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by public network 12, and such packets traverse gateway 8 as part of at least one packet flow. Flows 26 illustrated in FIG. 1 represent one or more upstream packet flows from any one or more subscriber devices 16 and directed to public network 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authentication to service provider network 2 and establish a communication session for receiving data services.

As described herein, service provider network 2 includes a services complex 9 having a cluster of service nodes 10A-10N (collectively "service nodes 10") that provide an execution environment for the network services. That is, each of service nodes 10 applies one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. In this way, each of service nodes 10 represents a service instance.

Although illustrated as part of a services complex 9, which may represent a data center, service nodes 10 may, for instance, be coupled by one or more switches or virtual switches of core network 7. In one example, each of service nodes 10 may run as virtual machines (VMs) or other virtual entities in a virtual computing environment. Moreover, the computing environment may comprise a scalable cluster of physical network devices, such as processor-based servers. As another example, service nodes 10 may comprise a combination of general purpose computing devices and special purpose appliances. Virtual service instances provided by service nodes 10 can scale vertically, just as in a modern data center, through the allocation of virtualized memory, processor utilization, storage and network policies, as well as horizontally by adding additional load-balanced virtual machines.

As shown in FIG. 1, gateway 8 steers individual subscriber packet flows 26 through defined sets of services provided by service nodes 10. That is, each subscriber packet flow may be forwarded through a particular ordered combination of services provided by service nodes 10, each ordered set being referred to herein as a "service chain," and each service chain providing a composite network service represented by the order and combination of individual network services (virtualized network functions) provided by the service nodes of the service chain. In the example of FIG. 1, one or more subscriber packet flows 26 are directed along a first service chain 28A and, therefore, receive services applied by service nodes 10A, 10B and 10N, in that order. Similarly, one or more subscriber packet flows 26 are directed along a second service chain 28B and, therefore, receive services applied by service nodes 10C, 10B and 10N.

In this way, subscriber flows 26 may be processed by service nodes 10 as the packets flow between access network 6 and public network 12 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N. Accordingly, packet flows 26 processed according to service chain 28A follow a service path that traverses nodes 10A, 10B, and finally node 10N as the terminal node for the service chain 28A. A particular service node may support multiple service chains. In this example, service node 10B supports service chains 28A, 28B. Once processed at a terminal node of the service chain, i.e., the last node to apply services to packets flowing along a particular service path, the terminal node may direct the traffic back to gateway 8 for further processing and/or forwarding to public network 12. For example, traffic engineered service paths may start and terminate with gateway 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber device 16 may be associated with a particular service profile, which in turn is mapped to a service tunnel associated with service chain 28A. Similarly, another subscriber device 16 may be associated with a different service profile, which in turn is mapped to a service tunnel associated with service chain 28B. Gateway 8, after authenticating and establishing access sessions for the subscribers, directs packet flows for subscriber devices 16 along the appropriate service tunnels, thereby causing service complex 9 to apply the requisite ordered services for the given subscriber device.

Service nodes 10 may implement service chains 28A, 28B using internally configured forwarding state that directs packets of the packet flow long the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect service nodes 10 may be configured to direct packet flows to service nodes 10 according to service chains 28A, 28B.

In FIG. 1, software-defined networking (SDN) controller 19 provides a high-level controller for configuring and managing routing and switching infrastructure of service provider network 2 (e.g., gateway 8, core network 7 and service nodes 10). In some instances, SDN controller 19 manages deployment of virtual machines (VMs) or other virtual entities within the operating environment of services complex 9. For example, SDN controller 19 may establish one or more of service nodes 10 as a virtual service instance configured to apply a given service to packets. In this example, service provider network 2 may comprise a SDN/network functions virtualization (NFV) environment.

In addition, SDN controller 19 may interact with gateway 8 to specify service chain 28A, 28B information. For example, the service chain information provided by SDN controller 19 may specify any combination and ordering of services provided by service nodes 10, traffic engineering information (e.g., labels or next hops) for tunneling or otherwise transporting (e.g., MPLS or IP tunnels) packet flows along service paths, rate limits, Type of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the entire contents of which are incorporated herein by reference.

Based on the specification of the service chain 28A, 28B information, SDN controller 19 may also establish unique tunnels for transporting packets of packet flows 26 between gateway 8 and service nodes 10, and for transporting packet between service nodes 10 within services complex 9. For example, SDN controller 19 may perform path computation and issue path setup messages and/or distribute labels or other header information to be used at each hop along each service path. Example details of an SDN controller capable of performing path computation and distributing labels to network elements are described in U.S. patent application Ser. No. 13/842,453, filed Mar. 15, 2013, the entire contents of which are incorporated herein by reference.

As discussed above, service nodes 10 may comprise virtual service instances deployed as VMs or other virtual entities hosted on one or more physical devices, e.g., servers, to offer individual services or chains of services. The use of virtual service instances enables automatic scaling of the services on-demand. In one example, SDN controller 19 may establish or instantiate additional virtual service instances within services complex 9 for a given service based on an increased needed for the given service by packets of packet flows 26 received by gateway 8. In another example, SDN controller 19 may remove or tear down virtual service instances from services complex 9 for a given service based on a decreased needed for the given service by packets of packet flows 26 received by gateway 8.

To achieve service chaining with high scale and throughput, gateway 8 may be used to anchor packets of packet flows 26 to the services offered by service nodes 10 in both a forward and a reverse direction. In addition, gateway 8 may be used to perform load balancing of packet flows 26 to first or front-end services in the service chains. In some scenarios, one virtual service instance or VM per service may not be enough to support the service needs of packet flows 26. In this case, complete functionality for a given service may span across multiple VMs hosted on one or more physical servers. Hence, a need for load balancing across virtual service instances may arise at gateway 8. For example, in situations where two or more of service nodes 10, e.g., service nodes 10A and 10C, offer the same service, gateway 8 may include service nodes 10A, 10C in a load balancing group and load balance packets assigned to that service across tunnels to service nodes 10A, 10C.

Conventionally, a load balancing group for a given service is configured manually to include the service-providing entities, e.g., real or virtual service instances of services nodes 10, operating at a point in time. The load balancing group may be manually updated periodically to reflect changes in the service-providing entities. In the case of virtual service instances, however, manual configuration of the load balancing group for the given service may be unable to accurately track the on-demand scaling (i.e., instantiating and/or tearing down) of the virtual service instances for the given service. Since the virtual service instances can be dynamically added, deleted, or migrated on physical network devices, and the services can go down and come up due to scheduled maintenance, it may be desirable for gateway 8 to be able to automatically discover the virtual service instances established for a given service.

According to the techniques of this disclosure, gateway 8 and SDN controller 19 are configured to enable automatic discovery of two or more virtual service instances, e.g., two or more of service nodes 10, configured to apply a given service to packets of packet flows 26. According to the techniques, SDN controller 19 and gateway 8 establish a border gateway protocol (BGP) peer session 18 on which SDN controller 19 advertises BGP routes for the service. The advertised BGP routes represent unique tunnels established by SDN controller 19 that each extends from gateway 8 to a respective one of the virtual service instances of service nodes 10 for the given service. Gateway 8 discovers the virtual service endpoints of the advertised BGP routes as real services, and automatically updates a load balancing group for the given service to include the BGP routes. In this way, gateway 8 and SDN controller 19 support both auto-scaling and auto-discovery of services in an SDN/NFV environment, and a load balancer on gateway 8 can adjust along with the dynamic services in the SDN/NFV environment.

Upon receipt of packets of packet flows 26 assigned to the given service or a service chain with the given service as the front-end service, a load balancer of gateway 8 selects one of the BGP routes from the load balancing group for the given service. Gateway 8 may modify the packets of packet flows 26 as gateway 8 steers the packets into the appropriate service or service chain. For example, gateway 8 may prepend to each packet a header and/or label (e.g., an additional IP header and/or MPLS label) to form a "tunnel packet" in which the packet is encapsulated as a payload. Gateway 8 may select the particular header based on the particular subscriber and the service chain to which the particular type of packet flow for the particular subscriber is assigned. In accordance with the techniques of this disclosure, gateway 8 may further select the particular header and/or label based on the one of the BGP routes selected from the load balancing group for the front-end service of the service chain. Gateway 8 then forwards the encapsulated packets based on the header and/or label for the selected BGP route to the virtual service endpoint for application of the given service to the packets.

In some example implementations, the functionality and operations described herein in reference to SDN controller 19 may be implemented by a combination of devices or components. For example, in one example implementation, the functionality and operations described herein in reference to SDN controller 19 may be implemented by an orchestration engine operating in concert with an SDN controller that manages underlying network state for routing and switching components so as to provide the requested network and network services. As such, SDN controller 19 of FIG. 1 may represent an orchestration engine that manages networking services and an underlying SDN controller that implements high-level requests from the orchestration engine by configuring physical switches, e.g. TOR switches, chassis switches, or switch fabric of the service provider core; physical routers; physical service nodes such as firewalls and load balancers and the like. Although not shown in FIG. 1, any reference to the term SDN controller herein is understood to encompass implementations in which an orchestration engine is used as part of or in conjunction with the SDN controller. Further example details of an orchestration engine are described in ETSI GS NFV-MAN 001, Network Functions Virtualisation (NFV) Management and Orchestration, dated December 2014, the entire contents of which are incorporated herein by reference.

Figure 2:
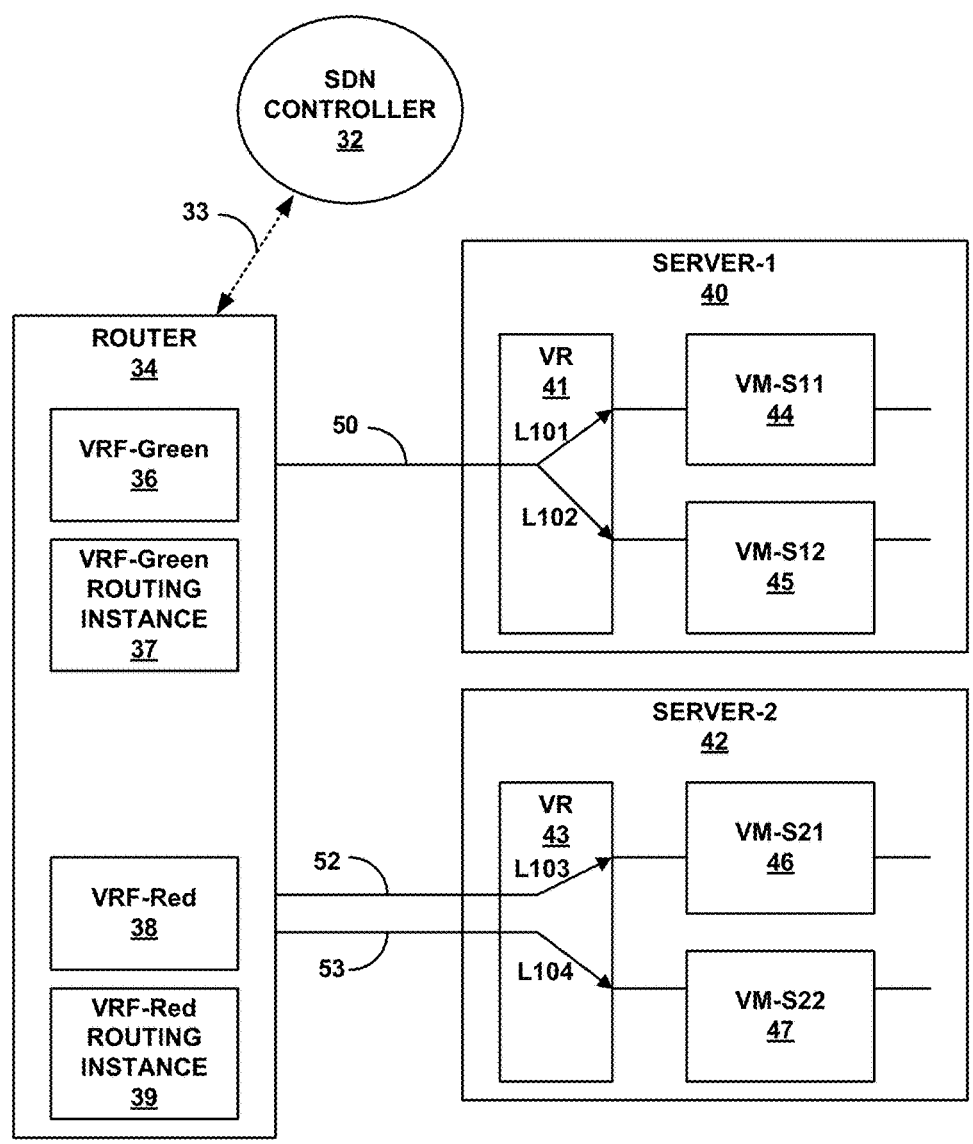
FIG. 2 is a block diagram illustrating a portion of an example service provider network operating in accordance with techniques described herein.

FIG. 2 is a block diagram illustrating a portion of an example service provider network operating in accordance with techniques described herein. The service provider network illustrated in FIG. 2 includes an SDN controller 32, a router 34, a first physical server-1 40, and a second physical server-2 42. The SDN controller 32 may operate substantially similar to SDN controller 19 from FIG. 1. Router 34 may operate substantially similar to gateway network device 8 from FIG. 1. As described in more detail below, server-1 40 hosts virtual machines (VMs) 44, 45 and server-2 42 hosts VMs 46, 47 that are each configured as virtual service instances. The VMs hosted by server-1 40 and server-2 42 may operate substantially similar to service nodes 10 from FIG. 1.

SDN controller 32 operates as a network service controller and establishes two or more virtual service instances of a given service on at least one physical network device, e.g., service-1 40 and/or server-2 42. The service provider network illustrated in FIG. 2 offers a "green" service and a "red" service. Each of the green service and the red service may be any of a firewall and security service, CG-NAT service, media optimization service, IPSec/VPN service, DPI service, HTTP filtering service, or other types of services applied to network traffic.

In the illustrated example of FIG. 2, server-1 40 executes a virtual router (VR) 41 that hosts a first virtual service instance VM-S11 44 and a second virtual service instance VM-S12 45 for the green service. In this example, VR 41 may be configured with a green service-specific route target (RT), e.g., 65412:1. In addition, server-2 42 executes VR 43 that hosts a third virtual service instance VM-S21 46 for the green service and a first virtual service instance VM-22 47 for the red service. In this example, VR 43 may be configured with the green service-specific RT, e.g., 65412:1, and with a red service-specific RT, e.g., 75412:1.

SDN controller 32 also establishes unique tunnels that each extends from router 34 to a respective one of the virtual service instances configured to apply the given service to packet flows. FIG. 2 illustrates a first unique tunnel that extends from router 34 to first virtual service instance VM-S11 44 of the green service being identified by a tunnel address of GRE tunnel 50 with label L101 assigned to VM-S11 44, and a second unique tunnel that extends from router 34 to second virtual service instance VM-S12 45 of the green service being identified by the tunnel address of GRE tunnel 50 with label L102 assigned to VM-S12 45. In one example, the tunnel address of GRE tunnel 50 may be gr-1/0/0.32270. FIG. 2 illustrates a third unique tunnel that extends from router 34 to third virtual service instance VM-S21 46 of the green service being identified by a tunnel address of GRE tunnel 52 with label L103 assigned to VM-S21 46. In one example, the tunnel address of GRE tunnel 52 may be gr-1/1/0.32271. In addition, FIG. 2 illustrates a fourth unique tunnel that extends from router 34 to first virtual service instance VM-S22 47 of the red service being identified by a tunnel address of GRE tunnel 53 with label L104 assigned to VM-S22 47. In one example, the tunnel address of GRE tunnel 53 may be gr-1/2/0.32272.

SDN controller 32 and router 34 establish a BGP peer session 33 over which SDN controller 32 and router 34 exchange BGP messages, such as routing information. SDN controller 32 calculates BGP routes that represent the unique tunnels between router 34 and the virtual service instances for the green service and the red service. SDN controller 32 then advertises the BGP routes for each of the green service and the red service to router 34 via BGP peer session 33. For example, for the green service, SDN controller 32 may calculate and advertise an ECMP next hop route set for the green service including a first member route to reach VM-S11 44, a second member route to reach VM-S12 45, and a third member route to reach VM-S21 46. As another example, for the red service, SDN controller 32 may calculate and advertise an ECMP next hop route set for the red service including a first member route to reach VM-S22 47.

Within router 34, the BGP and routing-instances related configurations are setup appropriately to listen to BGP routes from SDN controller 32. For example, router 34 includes virtual routing and forwarding (VRF) route distinguisher (RD) attributes and VRF route target (RT) attributes that may be configured to listen for ECMP next hops advertised by SDN controller 32 via BGP peer session 33. Whenever SDN controller 32 configures one or more virtual service instances (e.g., VMs) on physical network devices, SDN controller 32 communicates the BGP routes to reach the virtual service instances to router 34 via BGP peer session 33. In this way, SDN controller 32 may set up an ECMP next hop route set for each service in router 34 with each member route of the ECMP next hop route set representing one of the unique tunnels that extends to one of the virtual service instances of the service.

A load balancer of router 34 considers each of the virtual service endpoints of the unique tunnels represented by the BGP routes to be real services for the purpose of load balancing. According to the disclosed techniques, router 34 maintains a load balancing group for each of the green service and the red service that includes the BGP routes for the given service as load balancing entities. In the illustrated example of FIG. 2, router 34 includes a VRF-Green table 36 for the green service, and a VRF-Green routing instance 37 that includes the green service-specific RT. Similarly, router 34 includes a VRF-Red table 38 for the red service, and a VRF-Red routing instance 39 that includes the red service-specific RT. In the example of FIG. 2, router 34 maintains the load balancing group for the green service in VRF-Green table 36, and maintains the load balancing group for the red service in VRF-Red table 38.

For each of the BGP routes included in the load balancing group for the given service, the VRF table for the service includes a tunnel identifier for the unique tunnel that extends to the virtual service instance represented by the respective one of the BGP routes. For example, VRF-green table 36 may include a first tunnel identifier for the first unique tunnel that extends to first virtual service instance VM-S11 44 comprising a tunnel address of GRE tunnel 50 with label L101 assigned to VM-S11 44. VRF-green 36 may also include a second tunnel identifier for the second unique tunnel that extends to second virtual service instanceVM-S12 45 comprising a tunnel address of GRE tunnel 50 with label L102 assigned to VM-S12 45. VRF-green 36 may further include a third tunnel identifier for the third unique tunnel that extends to third virtual service instance VM-S21 46 comprising a tunnel address of GRE tunnel 52 with label L103 assigned to VM-S21 46. As another example, VRF-red table 38 may include a first tunnel identifier for the first unique tunnel that extends to first virtual service instance VM-S22 47 comprising a tunnel address of GRE tunnel 53 with label L104 assigned to VM-S22 47.

In one example, VRF-Green table 36 may include the following ECMP next hop route set for the green service.
  VRF-Green (route learnt via BGP)=0.0.0.0/0 ECMP {
   (gr-1/0/0.32270, L101),
   (gr-1/0/0.32270, L102),
   (gr-1/1/0.32271, L103)}
In addition, VRF-Green routing instance 37 may be configured to import the green service-specific RT of VR 41 and VR 43: Import RT=65412:1.

In another example, VRF-Red table 38 may include the following ECMP next hop route set for the red service.
  VRF-Red (route learnt via BGP)=0.0.0.0/0 ECMP {
   (gr-1/2/0.32272, L104)}
In addition, VRF-Red routing instance 39 may be configured to import the red service-specific RT of VR 43: Import RT=75412:1.

Once the VRF tables and load balancing groups are configured in router 34, router 34 may perform load balancing across the unique tunnels that extend to virtual service endpoints for a given service. For example, in response to receiving a packet having a source IP address of 41.1.1.1 and a destination IP address of 100.1.1.1, router 34 may first determine which service or service chain is assigned to the packet. In the case where the assigned service, or the front-end service of the assigned service chain, is the green service, router 34 accesses the load balancing group in VRF-Green 36. The load balancer of router 34 performs load balancing based on a load balancing algorithm to select one of the BGP routes from the load balancing group on which to forward the packet to reach one of the virtual service instances VM-S11 44, VM-S12 45, or VM-S21 46 of the green service.

Router 34 may then encapsulate the received packet with the tunnel identifier for the unique tunnel that extends to the virtual service instance represented by the selected one of the BGP routes. For example, in the case where the load balancer of router 34 selects the BGP route that represents the second unique tunnel that extends to the second virtual service instance VM-S12 45, router 34 may encapsulate the received packet with the second tunnel identifier in VRF-Green 36, which includes a tunnel address of GRE tunnel 50 with label L102 assigned to VM-S12 45, e.g., gr-1/0/0.32270, L102. Router 34 then forwards the encapsulated packet according to the tunnel identifier for the selected BGP route to the virtual service instance for application of the green service to the packet.

In response to receiving the encapsulated packet via GRE tunnel 50, VR 41 processes and removes the GRE tunnel address, e.g., gr-1/0/0.32270, of the tunnel identifier used to reach server-1 40 from the encapsulated packet. VR 41 then reads and removes the label, e.g., L102, assigned to the second virtual service instance VM-S12 45. Based on the label, VR 41 forwards the decapsulated, original packet, e.g., having the source IP address of 41.1.1.1 and the destination IP address of 100.1.1.1, onto an appropriate tap interface of VM-S12 45. VM-S12 45 then applies the required service on the original packet.

One or more advantages of the disclosed techniques are described below. The techniques do not require any manual configuration as SDN controller 32 and router 34 automatically discover the real services dynamically and support auto scaling. The techniques use BGP to learn the real services from SDN controller 32. The techniques enable the load balancer of router 34 to gracefully handle the automatic scaling events of the real services scaling up and down, and scaling in and out. The techniques require no explicit health monitoring to the backend real services. Instead, BGP ECMP next hop updates may indicate which real services are down or deleted. The techniques solve the use case of load balancing in a SDN/NFV environment. The techniques enable more capacity to be dynamically added in SDN/NFV environment whether or not the virtual service instances are hosted on the same physical server or different servers. The techniques do not use domain name system (DNS) and, thus, do not require any DNS setup, DNS servers, and DNS configuration. Instead, according to the techniques of this disclosure, auto-scaling and auto-discovery of services is fully automatic via BGP.

Figure 3:
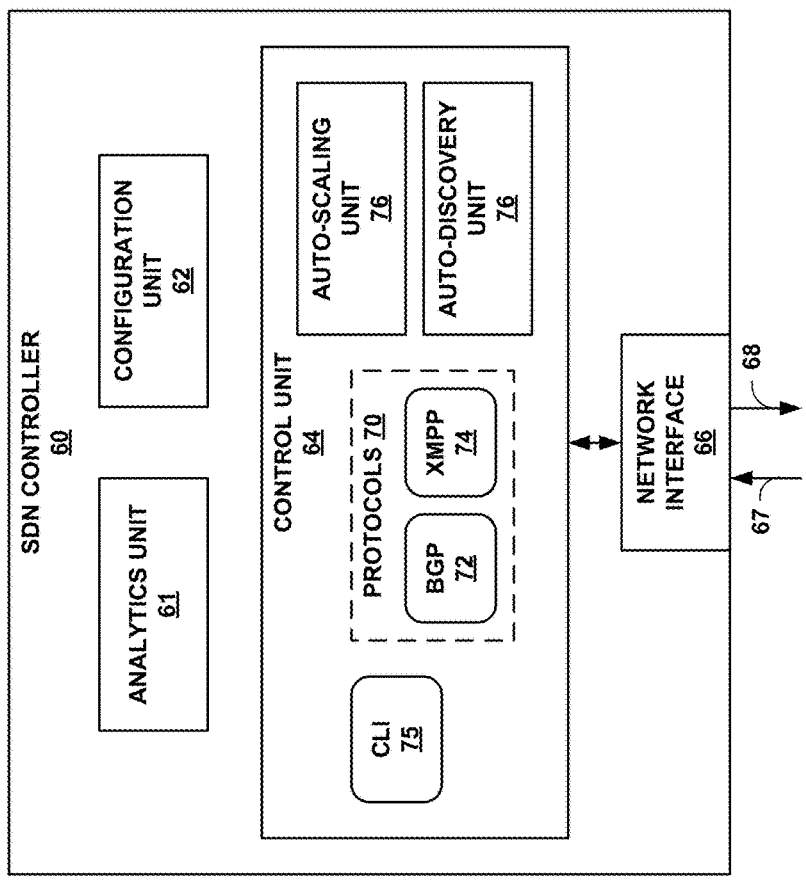
FIG. 3 is a block diagram illustrating an example SDN controller configured to implement the techniques described herein.

FIG. 3 is a block diagram illustrating an example SDN controller 60 configured to implement the techniques described herein. SDN controller 60 may operate as a network services controller for a service provider network. In some examples, SDN controller 60 may operate substantially similar to SDN controller 19 from FIG. 1 and/or SDN controller 32 from FIG. 2.

In the illustrated example of FIG. 3, SDN controller 60 includes an analytics unit 61, a configuration unit 62, and a control unit 64 coupled to a network interface 66 to exchange packets with network devices by inbound link 67 and outbound link 68. In some examples, analytics unit 61, configuration unit 62, and/or control unit 64 may be implemented as one or more processes executing on one or more virtual machines of one or more physical computing devices. That is, while generally illustrated and described as executing on a single SDN controller 60, aspects of these units may be delegated to other computing devices.

Each of analytics unit 61, configuration unit 62, and control unit 64 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively, or additionally, each of analytics unit 61, configuration unit 62, and control unit 64 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SDN controller 60 illustrated in FIG. 3 is shown for example purposes only and should not be limited to this architecture. In other examples, SDN controller 60 may be configured in a variety of ways.

Analytics unit 61 and configuration unit 62 may comprise a management layer of SDN controller 60, whereas control unit 64 may comprise a control layer of SDN controller 60. Analytics unit 61 may capture information from physical and/or virtual network elements within the service provider network, e.g., gateway 8 and service nodes 10 within service provider network 2 from FIG. 1, and analyze the information for use in managing the network services offered by the service provider. The information may include statistics, logs, events, and errors.

Configuration unit 62 stores configuration information for the network elements within the service provider network. In some examples, the configuration information comprises a virtual network configuration. Configuration unit 62 may translate a high-level data model of the intended virtual network configuration to a lower-level data model for use in interacting with the network elements.

Control unit 64 of SDN controller 60 implements a centralized control plane for the service provider network that is responsible for maintaining a constantly changing network state. Control unit 64 interacts with the network elements within the service provider network to maintain a consistent network state across all of the network elements. Control unit 64 provides an operating environment for a command line interface daemon 75 ("CLI 75") that provides an interface by which an administrator or other management entity may modify the configuration of SDN controller 60 using text-based commands. Control unit 64 also provides an operating environment for several protocols 70, including Border Gateway Protocol (BGP) 72 and Extensible Messaging and Presence Protocol (XMPP) 74 illustrated in FIG. 3.

In some examples, control unit 64 uses XMPP 74 to communicate with network elements within the service provider network, such as gateway 8 or service nodes 10 within service provider network 2 from FIG. 1, by an XMPP interface (not shown). Virtual network route data, statistics collection, logs, and configuration information may be sent as extensible markup language (XML) documents in accordance with XMPP 74 for communication between SDN controller 60 and the network elements. Control unit 64 may also use XMPP 74 to communicate with one or both of analytics unit 61 and configuration unit 62 of SDN controller 60. Control unit 64 executes BGP 72 to establish BGP peer sessions with BGP speakers and BGP listeners within the service provider network to exchange routing information. For example, control unit 64 may use BGP 72 to establish a BGP peer session with a gateway network device, e.g., BGP peer session 18 with gateway 8 from FIG. 1 or BGP peer session 33 with router 34 from FIG. 2.

Control unit 64 includes an auto-scaling unit 76 configured to communicate with physical network devices, e.g., servers, using XMPP 74 to establish or remove virtual network service instances in response to fluctuating demands for different services for packet flows in the service provider network. For example, auto-scaling unit 74 may establish a set of two or more virtual service instances of a given service as two or more virtual machines (VMs) or other virtual entities running on at least one physical network device, such as a server. Auto-scaling unit 76 may also be configured to use BGP 72 to establish unique tunnels that each extends from a gateway network device in the service provider network to a respective one of the set of instantiated virtual service instances of the given service. As discussed above with respect to FIG. 2, each of the unique tunnels may have a tunnel identifier that includes a tunnel address of a GRE tunnel that extends from the gateway network device to the physical network device, and a label assigned to one of the virtual service instances of the given service running on the physical network device.

In accordance with the disclosed techniques, control unit 64 also includes an auto-discovery unit 76 configured to calculate BGP routes that represent the unique tunnels between the gateway network device and the virtual service instances of the given service. Auto-discovery unit 76 is further configured to advertise the BGP routes for the given service to the gateway network device via a BGP peer session with the gateway network device as load balancing entities. For example, auto-discovery unit 76 may advertise an ECMP next hop route set for the given service that includes two or more member routes to reach the two or more virtual service instances of the given service. Advertising the BGP routes with virtual service endpoints as load balancing entities, as described herein, enables the gateway network device to automatically discover the virtual service endpoints and perform load balancing on the BGP routes to forward packet flows to the given service.

Figure 4:
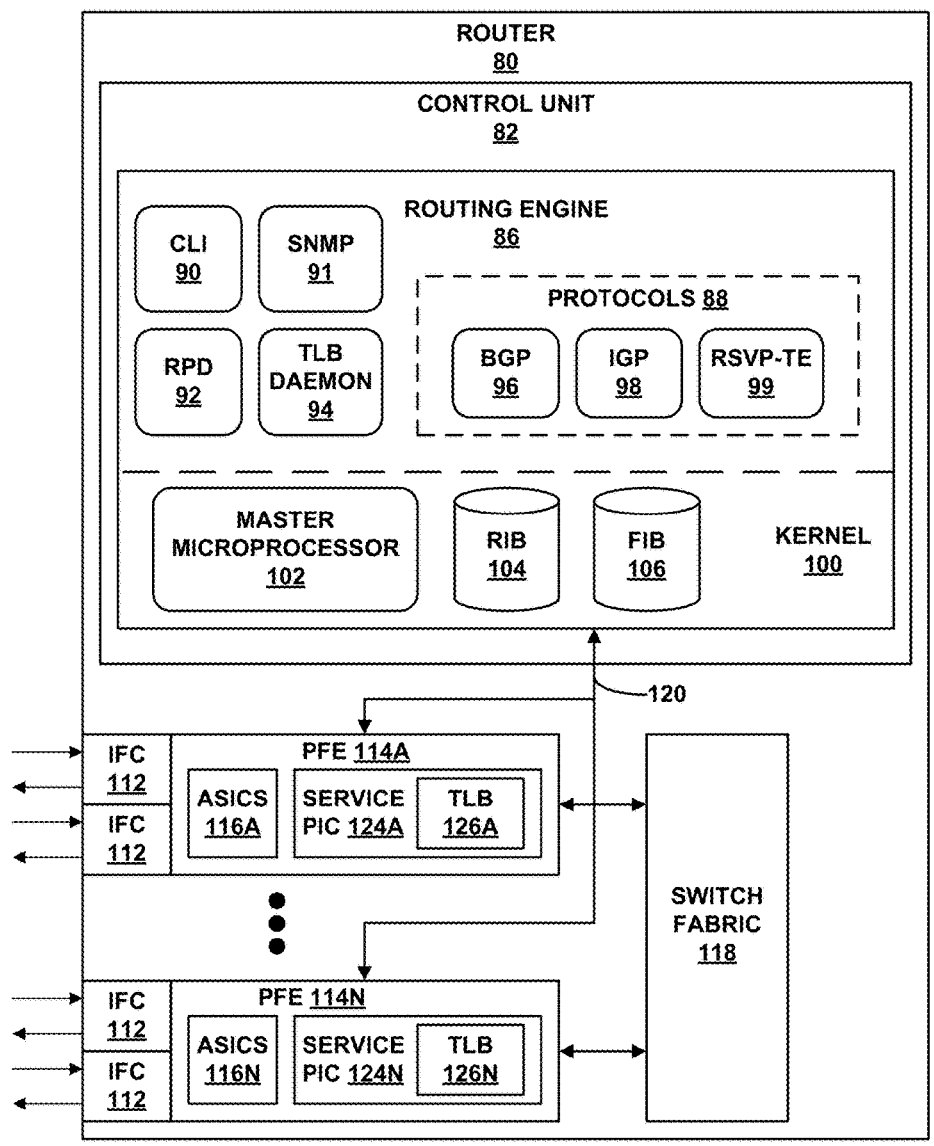
FIG. 4 is a block diagram illustrating an example router configured to implement the techniques described herein.

FIG. 4 is a block diagram illustrating an example router 80 configured to implement the techniques described herein. Router 80 may comprise any router in a network having a SDN/NFV architecture, such as service provider network 2 from FIG. 1. For example, router 80 may comprise a gateway, an edge router, a core router or other device illustrated in FIG. 1 that directs packet flows to a service complex for application of network services.

In the example of FIG. 4, router 80 includes control unit 82 in which routing engine 86 provides control plane functionality for router 80. Router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In the illustrated example, routing engine 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network.

Control unit 82 provides an operating environment for routing engine 86 and may be implemented solely in software, or hardware, or may be implemented as a combination of software, hardware or firmware. For example, control unit 82 may include one or more processors that execute software instructions. In that case, routing engine 86 may include various software modules or daemons (e.g., one or more routing protocol processes, user interfaces, and the like), and control unit 82 may include a computer-readable storage medium, such as computer memory or hard disk, for storing executable instructions.

Routing engine 86 provides an operating environment for a command line interface daemon 90 ("CLI 90") that provides an interface by which an administrator or other management entity may modify the configuration of router 80 using text-based commands. Simple Network Management Protocol daemon 91 ("SNMP 91") comprises an SNMP agent that receives SNMP commands from a management entity to set and retrieve configuration and management information for router 80. Using CLI 90 and SNMP 91, management entities may enable/disable and configure services, install routes, enable/disable and configure rate limiters, and configure interfaces, for example.

Routing engine 86 also provides an operating environment for execution of various protocols 88 that may comprise software processes having instructions executed by a computing environment. Routing engine 86 executes a routing protocol daemon (RPD) 92 that uses one or more routing protocols, such as BGP 96 and internal gateway protocol (IGP) 98, to maintain routing information in the form of routing information base (RIB) 104 that describes a topology of a network, and derives a forwarding information base (FIB) 106 in accordance with the routing information. In general, the routing information represents the overall topology of the service provider network. RPD 92 interacts with kernel 100 (e.g., by way of application programming interface (API) calls) to update RIB 104 based on routing protocol messages received by router 80. RIB 104 may include information defining a topology of the network, including one or more routing tables and/or link-state databases. Typically, the routing information defines routes (i.e., series of next hops) through a network to destinations/ prefixes within the network learned via a distance-vector routing protocol (e.g., BGP 96) or defines the network topology with interconnected links learned using a link state routing protocol (e.g., intermediate-system to intermediate-system (IS-IS) or open shortest path first (OSPF)) of IGP 98.

Routing engine 86 also executes one or more traffic engineering protocols to establish tunnels for forwarding subscriber packets through the ordered set of service nodes associated with different service chains. For example, RSVP-TE 99 may execute the Resource Reservation Protocol with Traffic Engineering extensions to exchange traffic engineering (TE) information, such as MPLS labels for enabling label-based packet forwarding. As another example, routing engine 86 may use GRE or IP-based tunneling protocols to established traffic engineered tunnels.

As described with respect to the techniques of this disclosure, routing engine 86 executes BGP 96 to establish BGP peer sessions with BGP speakers and BGP listeners within the service provider network to exchange routing information. For example, routing engine 86 may use BGP 96 to establish BGP peer sessions with other routers in the service provider network and with a SDN controller of the service provider network, e.g., BGP peer session 18 with SDN controller 19 from FIG. 1 or BGP peer session 33 with SDN controller 32 from FIG. 2. Routing engine 86 may then receive BGP route advertisements for a given service from the SDN controller via the BGP peer session. The advertised BGP routes represent unique tunnels established by the SDN controller that each extends from router 80 to a respective one of a set of two or more virtual service instances of the given service. In this way, router 80 is able to automatically discover the virtual service instances configured to apply a given service to packets.

In accordance with the techniques described in this disclosure, routing engine 86 executes a traffic load balancer (TLB) daemon 94 that maintains a load balancing group for the given service that includes each of the BGP routes for the given service. In this way, each of the virtual service endpoints of the BGP routes will be viewed as real services and used as load balancing entities. The load balancing group for the given service may be maintained in a virtual routing and forwarding (VRF) table (not shown) for the given service within FIB 106. For example, TLB daemon 94 interacts with kernel 100 (e.g., by way of API calls) to install the BGP routes in the VRF table for the given service in FIB 106. In some cases, the BGP routes stored in the VRF table comprise an ECMP next hop route set that includes two or more member routes to reach the two or more virtual service instances of the given service. TLB daemon 94 stores each of the BGP routes in the VRF table with a tunnel identifier for the unique tunnel represented by the respective one of the BGP routes. The tunnel identifier for a particular unique tunnel includes a tunnel address of a GRE tunnel that extends from router 80 to a physical network device, and a label assigned to one of the virtual service instances of the given service running on the physical network device.

Routing engine 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of router 80. In some instances, routing engine 86 may derive separate and different software FIBs for each respective PFEs 114. In addition, one or more of PFEs 114 include ASICs 116 that PFEs 114 program with a hardware-copy of the FIB based on the software FIBs (i.e., hardware versions of the software FIBs) copied to each respective PFE 114.

For example, kernel 100 executes on master microprocessor 102 and may comprise, for example, a UNIX operating system derivative such as Linux or Berkeley Software Distribution (BSD). Kernel 100 processes kernel calls from BGP 96, IGP 98, and RSVP-TE 99 to generate forwarding information in the form of FIB 106 based on the network topology represented in RIB 104, i.e., performs route resolution and path selection. Typically, kernel 100 generates FIB 106 in the form of radix or other lookup tree to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. As described above, FIB 106 may also include one or VRF tables (not shown) that each store BGP routes to virtual service instances of a given service.

Master microprocessor 102 executing on kernel 100 programs PFEs 114 to install copies of the FIB 106 including the VRF tables. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In the example illustrated in FIG. 4, ASICs 116 are microcode-controlled chipsets (i.e., forwarding circuits) programmably configured by a slave microprocessor executing on each of PFEs 114. When forwarding packets, control logic with each of ASICs 116 traverses the forwarding information (i.e., FIB 106) received from routing engine 86 and, upon reaching a FIB entry for the packet (e.g., a leaf node), microcode-implemented control logic automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 114, an egress interface or other components of router 80 to which the packet is directed prior to egress, such as one or more service physical interface cards (PICs) 124A-124N (collectively, "service PICs 124") of PFEs 114. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example. In accordance with the techniques of this disclosure, router 80 includes traffic load balancers (TLBs) 126A-126N ("TLBs 126") running on service PICs 124 of PFEs 114. TLBs 126 may comprise stateful or stateless traffic load balancers.

In general, kernel 100 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. Service PICs 124 of PFEs 114 may be similarly programed to store forwarding structures of the VRF tables within FIB 106 associated with a given service. For example, one or more of service PICs 124 may be configured with a load balancing group for a given service that includes BGP routes representing unique tunnels to virtual service instances of the given service.

The techniques of this disclosure enable TLBs 126 within service PICs 124 to apply a load balancing algorithm in order to select one of the BGP routes from the load balancing group for the given service on which to forward subscriber packets assigned to the given service. Upon selecting one of the BGP routes from the load balancing group, ASICs 116 may encapsulate the received packet with the tunnel identifier for the unique tunnel that extends to the virtual service instance represented by the selected one of the BGP routes. In this way, ASICs 116 may process subscriber packets to select particular service paths for each packet and encapsulate the subscriber packets in accordance with the selected service or service chain.

As a specific example of the disclosed techniques, TLB daemon 94 executing in routing engine 86 of router 34 may create real services for each of the virtual service endpoints of the BGP routes. TLB daemon 94 may create the real services with tunnel identifiers pointing to the unique tunnels represented by the BGP ECNIP next hop route sets, and associate the tunnel identifiers with a wildcard virtual server. The wildcard virtual server may be listening for traffic on one of service PICs 124, e.g., service PIC 124A. In this case, PFEs 114 may send traffic to the service PIC 124A based on configured filters. The service PIC 124A identifies the traffic arriving on this wildcard virtual server, and TLB 126A on service PIC 124A does load balancing based on configured load balancing algorithms. The service PIC 124A may then setup sessions to link the forward and reverse flow for subsequent packets.

When the next update on this ECMP next hop route set arrives at routing engine 86 from the SDN controller via BGP 96, TLB daemon 94 may check for any changes in the members of the next hops in the VRF. If there is any addition of real services, TLB daemon 94 adds the real services to the load balancing group in the VRF. If an ECMP next hop route set member is missing, TLB daemon 94 deletes the entry from the load balancing group in the VRF. For the real services that are deleted from the ECMP next hop route set, TLB 126A treats it as a deletion or down event on that real service (i.e., the VM or virtual entity hosting the virtual service instance). For transmission control protocol (TCP) clients, TCP Reset may be sent on the unique tunnels established to the real services. For user datagram protocol (UDP) clients, the session may be closed with a predefined timeout.

To support load balancing in a SDN environment, TLBs 126 in service PICs 124 may require that data packets be routed by a different address than the destination address of the packet. In such cases, TLBs 126 in service PICs 124 may provide the real service address (i.e., the tunnel identifier to route the packet to the given real service instance) in the JavaScript File Manager (JFM) Cookie along with the data packet. The PFEs 114 may then route the packet based on the tunnel identifier in the JFM Cookie instead of the destination IP address. Further details of a gateway network device capable of routing packets of packet flows based on cookies are described in U.S. patent application Ser. No. 14/042,685, filed Sep. 30, 2013, and U.S. patent application Ser. No. 14/228,706, filed Mar. 28, 2014, the entire contents of each of which are incorporated herein by reference.

Figure 5:
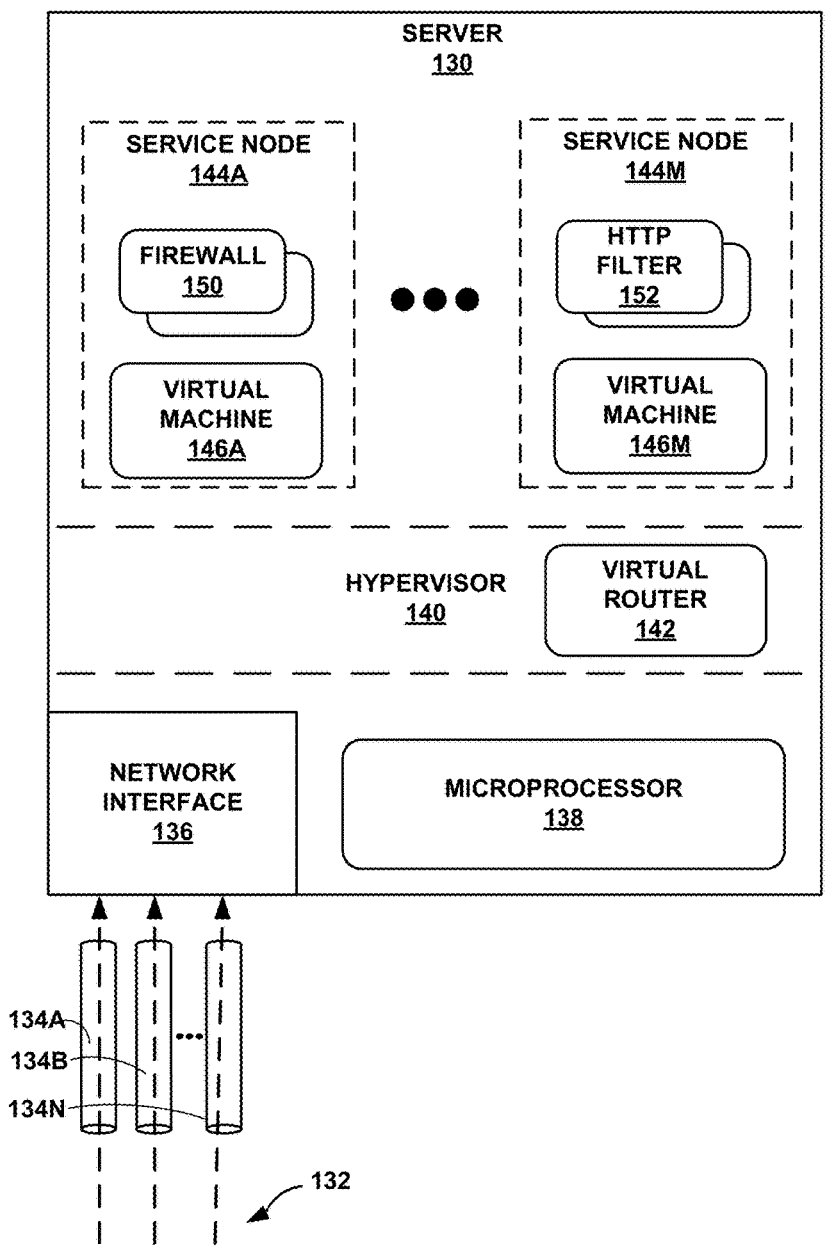
FIG. 5 is a block diagram illustrating an example server that provides an operating environment for one or more service nodes.

The architecture of router 80 illustrated in FIG. 5 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors that execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

FIG. 5 is a block diagram illustrating an example server 130 that provides an operating environment for one or more service nodes 144A-144M (collectively "service nodes 144"). In some examples, server 130 may comprise a server within a data center, such as services complex 9 from FIG. 1.

In this example, server 130 includes a network interface 136 to receive tunnel packets 132 over a plurality of unique tunnels 134A-134N (collectively "tunnels 134"). Each of the unique tunnels 134 corresponds to a different one of a plurality of services, which may be front-end services in different service chains that comprise different ordered sets of one or more stateful network services to be applied to packet flows. Each of the tunnel packets 132 encapsulates a subscriber packet and includes a tunnel identifier for one of the unique tunnels 134 that extends to one of the virtual service instances, e.g., service nodes 144A-144M (collectively "service nodes 144"), configured on servicer 130 to apply a given service to the tunnel packets 132. As described above, the tunnel identifier for one of the unique tunnels 134, e.g., unique tunnel 134A, that extends to one of the virtual service instances, e.g., service node 144A, includes a tunnel address of a GRE tunnel to reach server 130 with a label assigned to service node 144A.

In the example of FIG. 5, server 130 includes a microprocessor 138 executing hypervisor 140 to provide an execution environment for a virtual router 142 and one or more virtual machines 146A-146M (collectively "virtual machines 146") within service nodes 144. Virtual machines 146 of service nodes 144 provide virtual service endpoints for unique tunnels 134. Each of the virtual machines 146 executes network services software, such as firewall instance 150 within service node 144A and HTTP filter instance 152 within service node 144M, to apply one or more of the network services to the packet flows.

Upon receipt of tunnel packets 132 via one of unique tunnels 134, e.g., unique tunnel 134A, virtual router 142 processes and removes the tunnel identifiers of each of the tunnel packets to determine which of service nodes 144 to send the respective packet. For example, for a specific tunnel packet, virtual router 142 first removes the GRE tunnel address used to reach server 130 from the tunnel packet, and then reads and removes the label assigned to the service instance endpoint of unique tunnel 134A. Based on the label, virtual router 142 forwards the decapsulated packet onto the appropriate tap interface of one of service nodes 144, e.g., service node 144A. In this example, virtual machine 146A of service node 144A receives the decapsulated packet and applies the service of firewall instance 150 to the decapsulated packet.

Figure 6:
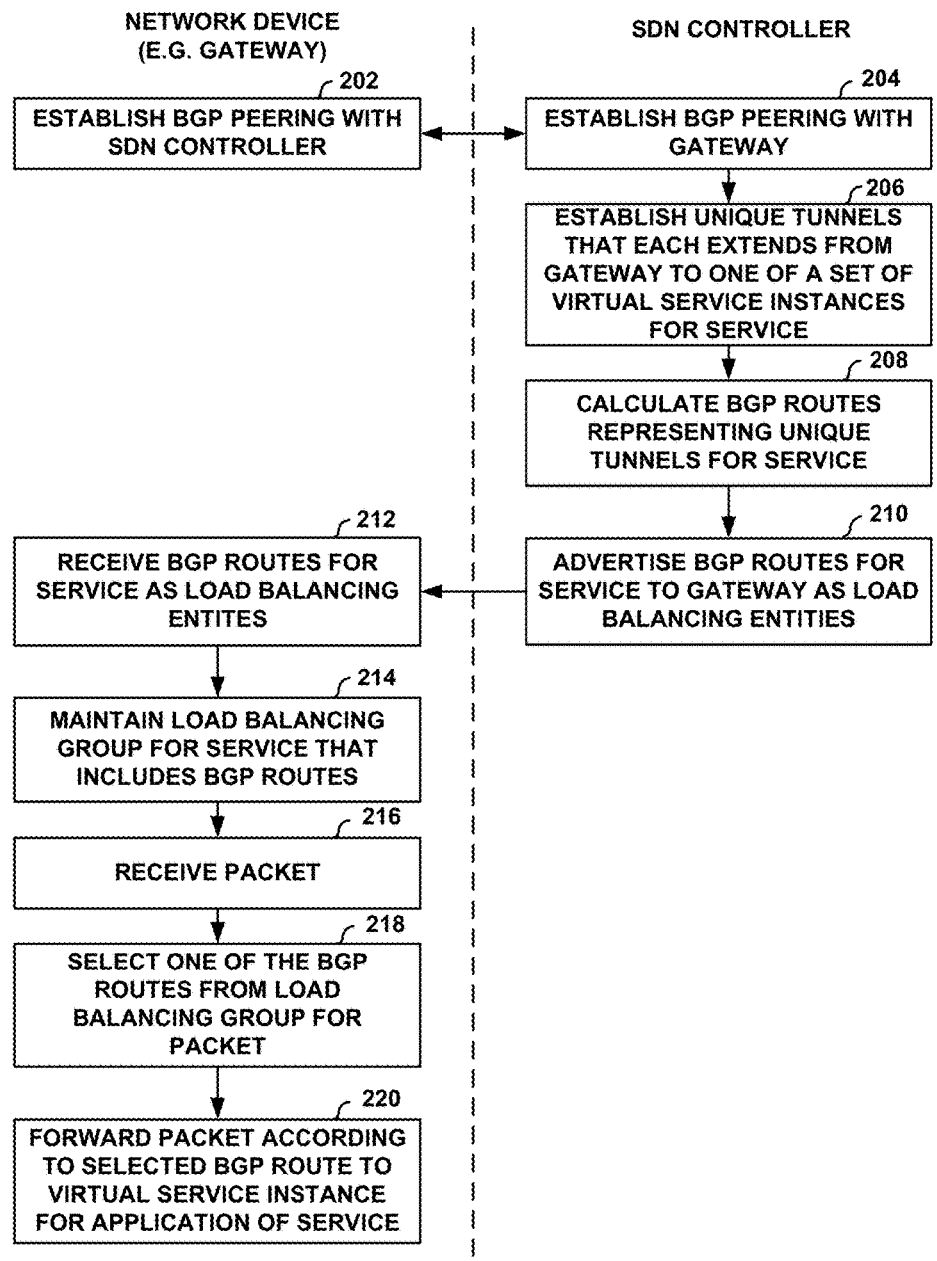
FIG. 6 is a flowchart illustrating exemplary operation of a network device, e.g., a router or gateway, and a SDN controller, in accordance with the techniques described herein.

FIG. 6 is a flowchart illustrating exemplary operation of a network device, e.g., a router or gateway, and a SDN controller, in accordance with the techniques described herein. The operation illustrated in FIG. 6 is described herein with respect to SDN controller 32 and router 34 from FIG. 2. In other examples, the operation illustrated in FIG. 6 may be performed by SDN controller 19 and gateway 8 from FIG. 1, or SDN controller 60 from FIG. 3 and router 80 from FIG. 4.

Router 34 establishes BGP peer session 33 with SDN controller 32 (202), and SDN controller 62 also establishes BGP peer session 33 with router 34 (204). In some examples, SDN controller 32 may initiate the BGP peering with router 34. In other examples, router 34 may initiate the BGP peering with SDN controller 32.

SDN controller 32 may also establish a set of two or more virtual service instances configured to apply a given service to a packet. In some cases, SDN controller 32 may establish the virtual service instances as two or more VMs running on a physical network device, such as a server. For example, as illustrated in FIG. 2, SDN controller 32 may establish the first virtual service instance of VM-S11 44 and the second virtual service instance of VM-S12 45 on server-1 40 for the green service. In other cases, SDN controller 32 may establish the virtual service instances as at least one VM running on a first physical network device and at least one VM running on a second physical network device. For example, as illustrated in FIG. 2, SDN controller 32 may establish the first and second virtual service instances as VM-S11 44 and VM-S12 45 on server-1 40, and establish the third virtual service instance of VM-S21 46 on server-2 42 for the green service.

SDN controller 32 establishes unique tunnels that each extends from router 34 to a respective one of the virtual service instances configured to apply the given service to the packet (206). As illustrated in FIG. 2, for the green service, SDN controller 32 establishes a first unique tunnel that extends from router 34 to VM-S11 44 hosted on server-1 40, the first unique tunnel being identified by a tunnel address of GRE tunnel 50 with label L101 assigned to the first virtual service instance of VM-S11 44. SDN controller 32 establishes a second unique tunnel that extends from router 34 to VM-S12 45 hosted on server-1 40, the second unique tunnel being identified by a tunnel address of GRE tunnel 50 with label L102 assigned to the second virtual service instance of VM-S12 45. SDN controller 32 also establishes a third unique tunnel that extends from router 34 to VM-S21 46 hosted on server-2 42, the third unique tunnel being identified by a tunnel address of GRE tunnel 52 with label L103 assigned to the third virtual service instance of VM-S21 46.

SDN controller 32 then calculates BGP routes that represent the unique tunnels that each extends to the respective one of the set of virtual service instances for the given service (208). SDN controller 32 advertises the BGP routes for the given service to router 34 via BGP peer session 33 as load balancing entities (210). In some cases, SDN controller 32 calculates and advertises an ECMP next hop route set that includes two or more member routes to reach the two or more virtual service instances configured to apply the given service. For example, SDN controller 32 may calculate and advertise an ECMP next hop route set for the green service including a first member route to reach the first virtual service instance of VM-S11 44 via the first unique tunnel, a second member route to reach the second virtual service instance of VM-S12 45, and a third member route to reach the third virtual service instance of VM-S21 46.

Router 34 receives the BGP route advertisements for the given service as load balancing entities from SDN controller 32 on BGP peer session 33 (212). Router 34 maintains a load balancing group for the given service that includes each of the BGP routes for the given service (214). In some cases, router 34 receives an ECMP next hop route set from SDN controller 32 that includes two or more member routes to reach the two or more virtual service instances configured to apply the given service. For example, router 34 may update the load balancing group for the green service based on the ECMP next hop route set to include a first member route to reach the first virtual service instance of VM-S11 44 via the first unique tunnel, a second member route to reach the second virtual service instance of VM-S12 45, and a third member route to reach the third virtual service instance of VM-S21 46.

In one example, router 34 maintains the load balancing group in a VRF table for the given service. In this example, for each of the BGP routes included in the load balancing group, the VRF table includes a tunnel identifier for the unique tunnel that extends to the virtual service instance represented by the respective one of the BGP routes. As illustrated in FIG. 2, router 34 may maintain the load balancing group for the green service in VRF-green 36. For example, VRF-green 36 may include a first tunnel identifier for the first unique tunnel that extends to the first virtual service instance of VM-S11 44 comprising a tunnel address of GRE tunnel 50 with label L101 assigned to VM-S11 44. VRF-green 36 may also include a second tunnel identifier for the second unique tunnel that extends to the second virtual service instance of VM-S12 45 comprising a tunnel address of GRE tunnel 50 with label L102 assigned to VM-S12 45. VRF-green 36 may further include a third tunnel identifier for the third unique tunnel that extends to the third virtual service instance of VM-S21 46 comprising a tunnel address of GRE tunnel 52 with label L103 assigned to VM-S21 46.

SDN controller 32 may continue to advertise BGP route updates for the given service to router 34 via BGP peer session 33 whenever changes to the BGP routes occur. As one example, the BGP route updates may include notifications of new virtual service instances established on one of server-1 40, server-2 42, or another server, for the given service. As another example, the BGP route updates may include notifications of removed virtual service instances from one of server-1 40, server-2 42, or another server, for the given service.

Router 34 may receive the BGP route update advertisements from SDN controller 32 on BGP peer session 33. Based on the received BGP route updates, router 34 updates the load balancing group for the given service. In one example, router 34 may add BGP routes to the load balancing group for any new virtual service instance notifications in the BGP route updates. In another example, router 34 may delete BGP routes from the load balancing group for any removed virtual service instance notifications in the BGP route updates.

Router 34 receives a packet sourced from a first network device and destined for a second network device (216). Upon receipt of the packet, router 34 determines one or more, or a chain, of services to apply to the packet prior to forwarding the packet toward its destination of the second network device. In accordance with the techniques of this disclosure, after determining to apply the given service to the received packet, router 34 selects, according to a load balancing algorithm, one of the BGP routes from the load balancing group on which to forward the packet to the one of the virtual service instances for application of the given service (218). For example, in the case where router 34 determines to apply the green service to the received packet, router 34 selects one of the BGP routes from the load balancing group included in VRF-green 36 on which to forward the packet to one of the virtual service instances of VM-S11 44, VM-S12 45, or VM-S21 46 configured to apply the green service to the packet.

Upon selecting one of the BGP routes from the load balancing group, router 34 may encapsulate the received packet with the tunnel identifier for the unique tunnel that extends to the virtual service instance represented by the selected one of the BGP routes. For example, in the case where router 34 selects the BGP route that represents the second unique tunnel that extends to the second virtual service instance of VM-S12 45, router 34 may encapsulate the received packet with the second tunnel identifier that includes a tunnel address of GRE tunnel 50 with label L102 assigned to VM-S12 45. Router 34 then forwards the encapsulated packet according to the tunnel identifier for the selected BGP route to the virtual service instance for application of the given service to the packet (220).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
   establishing, by a software-defined networking (SDN) controller, a border gateway protocol (BGP) peer session with a gateway network device of a network;

establishing, by the SDN controller, two or more virtual service instances for a given service on one or more physical network devices within a services complex coupled to the network;

establishing, by the SDN controller, two or more unique tunnels that each extends from the gateway network device to a respective one of a set of the two or more virtual service instances configured to apply the given service to a packet as a front-end service of a service chain within the services complex;

calculating, by the SDN controller, BGP routes for the given service, wherein each of the BGP routes represents one of the unique tunnels that extends from the gateway network device to the respective one of the virtual service instances; and advertising, by the SDN controller and to the gateway network device via the BGP peer session, the BGP routes for the given service as load balancing entities to be included in a load balancing group for the given service.

2. The method of claim 1, wherein calculating the BGP routes for the given service comprises calculating an equal cost multipath (ECMP) next hop route set having two or more member routes to reach the two or more virtual service instances configured to apply the given service.

3. The method of claim 1, wherein the one of the unique tunnels that extends from the gateway network device to the respective one of the virtual service instances is identified by a tunnel address of a generic routing encapsulation (GRE) tunnel with a label assigned to the respective one of the virtual service instances.

4. The method of claim 1, further comprising advertising, by the SDN controller and to the gateway network device via the BGP peer session, BGP route updates for the given service, wherein the BGP route updates include notifications of new virtual service instances for the given service or notifications of removed virtual service instances for the given service.

5. The method of claim 1, wherein establishing the two or more virtual service instances for the given service comprises establishing, by the SDN controller, the two or more virtual service instances as two or more virtual machines running on a same physical network device of the physical network devices within the services complex.

6. The method of claim 1, wherein establishing the two or more virtual service instances for the given service comprises establishing, by the SDN controller, the two or more virtual service instances as at least one first virtual machine running on a first physical network device of the physical network devices within the services complex and at least one second virtual machine running on a second physical network device of the physical network devices within the services complex.

7. A method comprising:
establishing, by a gateway network device of a network, a border gateway protocol (BGP) peer session with a software-defined networking (SDN) controller, wherein two or more virtual service instances for a given service are established by the SDN controller on one or more physical network devices within a services complex coupled to the network;

receiving, by the gateway network device and from the SDN controller via the BGP peer session, advertisements of BGP routes for the given service as load balancing entities, wherein each of the BGP routes represents one of two or more unique tunnels that each extends from the gateway network device to a respective one of the two or more virtual service instances configured to apply the given service to a packet as a front-end service of a service chain within the services complex;

maintaining, by the gateway network device, a load balancing group for the given service that includes each of the BGP routes for the given service; and selecting, by the gateway network device and according to a load balancing algorithm, one of the BGP routes from the load balancing group on which to forward the packet to the respective one of the virtual service instances for application of the given service as the front-end service of the service chain within the services complex.

8. The method of claim 7, wherein the BGP routes for the given service comprise an equal cost multipath (ECMP) next hop route set having two or more member routes to reach the two or more virtual service instances configured to apply the given service.

9. The method of claim 7, wherein maintaining the load balancing group for the given service comprises maintaining the load balancing group in a virtual routing and forwarding (VRF) table for the given service, wherein, for each of the BGP routes, the VRF table includes a tunnel identifier for the one of the unique tunnels that extends to the respective one of the virtual service instances represented by the respective one of the BGP routes.

10. The method of claim 9, wherein the tunnel identifier for the one of the unique tunnels that extends to the respective one of the virtual service instances comprises a tunnel address of a generic routing encapsulation (GRE) tunnel with a label assigned to the respective one of the virtual service instances.

11. The method of claim 9, further comprising:
receiving the packet sourced from a first network device and destined for a second network device;
upon selecting the one of the BGP routes from the load balancing group, encapsulating the packet with the tunnel identifier for the one of the unique tunnels that extends to the respective one of the virtual service instances represented by the selected one of the BGP routes; and
forwarding the encapsulated packet based on the tunnel identifier to the one of the virtual service instances for application of the given service to the packet.

12. The method of claim 7, further comprising receiving, by the gateway network device and from the SDN controller via the BGP peer session, advertisements of BGP route updates including at least one of notifications of new virtual service instances for the given service or notifications of removed virtual service instances for the given service.

13. The method of claim 12, further comprising updating the load balancing group for the given service based on the BGP route updates, wherein updating the load balancing group includes at least one of adding BGP routes to the load balancing group for any new virtual service instances or deleting BGP routes from the load balancing group for any removed virtual service instances.

14. A software-defined networking (SDN) controller comprising:
a plurality of network interfaces; and
a control unit comprising a processor executing a border gateway protocol (BGP) to:
establish a BGP peer session on one of the network interfaces with a gateway network device of a network, establish two or more virtual service instances for a given service on one or more physical network devices within a services complex coupled to the network, and establish two or more unique tunnels that each extends from the gateway network device to a respective one of the two or more virtual service instances configured to apply the given service to a packet as a front-end service of a service chain within the services complex, wherein the processor is configured to:

calculate BGP routes for the given service, wherein each of the BGP routes represents one of the unique tunnels that extends from the gateway network device to the respective one of the virtual service instances, and output the BGP routes for the given service to the one of the network interfaces for advertising to the gateway network device via the BGP peer session as load balancing entities to be included in a load balancing group for the given service.

15. The SDN controller of claim 14, wherein, to calculate the BGP routes for the given service, the processor is configured to calculate an equal cost multipath (ECMP) next hop route set having two or more member routes to reach the two or more virtual service instances configured to apply the given service.

16. The SDN controller of claim 14, wherein the one of the unique tunnels that extends from the gateway network device to the respective one of the virtual service instances is identified by a tunnel address of a generic routing encapsulation (GRE) tunnel with a label assigned to the respective one of the virtual service instances.

17. The SDN controller of claim 14, wherein the processor is configured to output BGP route updates for the given service to the one of the network interfaces for advertising to the gateway network device via the BGP peer session, wherein the BGP route updates include notifications of new virtual service instances for the given service or notifications of removed virtual service instances for the given service.

18. The SDN controller of claim 14, wherein the processor executes BGP to establish the two or more virtual service instances as two or more virtual machines running on a same physical network device of the physical network devices within the services complex.

19. The SDN controller of claim 14, wherein the processor executes BGP to establish the two or more virtual service instances as at least one first virtual machine running on a first physical network device of the physical network devices within the services complex and at least one second virtual machine running on a second physical network device of the physical network devices within the services complex.

20. A gateway network device of a network comprising:
a plurality of network interfaces;
a control unit comprising a processor executing a boarder gateway protocol (BGP) to:
establish a BGP peer session on one of the network interfaces with a software-defined networking (SDN) controller, wherein two or more virtual service instances for a given service are established by the SDN controller on one or more physical network devices within a services complex coupled to the network, wherein the processor is configured to:

receive advertisements of BGP routes for the given service as load balancing entities on the one of the network interfaces via the BGP peer session with the SDN controller, wherein each of the BGP routes represents one of two or more unique tunnels that each extends from the gateway network device to a respective one of the two or more virtual service instances configured to apply the given service to a packet as a front-end service of a service chain within the services complex, and maintain a load balancing group for the given service that includes each of the BGP routes for the given service; and a forwarding circuit programmed with forwarding information associated with the BGP routes, the forwarding circuit configured to select one of the BGP routes for the packet from the load balancing group according to a load balancing algorithm, and output the packet to one of the network interfaces for forwarding to the respective one of the virtual service instances for application of the given service as the front-end service of the service chain within the services complex.

21. The gateway network device of claim 20, wherein the BGP routes for the given service comprise an equal cost multipath (ECMP) next hop route set having two or more member routes to reach the two or more virtual service instances configured to apply the given service.

22. The gateway network device of claim 20, wherein the processor is configured to maintain a virtual routing and forwarding (VRF) table for the given service based on the BGP routes for the given service, wherein, for each of the BGP routes, the VRF table includes a tunnel identifier for the respective one of the unique tunnels that extends to the respective one of the virtual service instances represented by the respective one of the BGP routes.

23. The gateway network device of claim 22, wherein the tunnel identifier for the one of the unique tunnels that extends to the respective one of the virtual service instances is identified by a tunnel address of a generic routing encapsulation (GRE) tunnel with a label assigned to the respective one of the two or more virtual service instances.

24. The gateway network device of claim 22, wherein the forwarding circuit:

receives the packet sourced from a first network device and destined for a second network device;

upon selection of the one of the BGP routes from the load balancing group, encapsulates the packet with the tunnel identifier for the one of the unique tunnels that extends to the respective one of the virtual service instances represented by the selected one of the BGP routes; and outputs the encapsulated packet to the one of the network interfaces for forwarding to the respective one of the virtual service instances based on the tunnel identifier for application of the given service to the packet.

25. The gateway network device of claim 20, wherein the processor is configured to receive advertisements of BGP route updates on the one of the network interfaces via the BGP peer session with the SDN controller, wherein the BGP route updates include at least one of notifications of new virtual service instances for the given service or notifications of removed virtual service instances for the given service.

26. The gateway network device of claim 25, wherein the processor is configured to update the load balancing group for the given service based on the BGP route updates, the processor configured to at least one of add BGP routes to the load balancing group for any new virtual service instances or delete BGP routes from the load balancing group for any removed virtual service instances.

* * * * *